United States Patent
Niederer

[15] 3,672,501
[45] June 27, 1972

[54] EGG STABILIZER

[72] Inventor: Otto C. Niederer, Bear Tavern Road, Titusville, N.J. 08560

[22] Filed: Dec. 21, 1970

[21] Appl. No.: 99,955

[52] U.S. Cl. ......................................................... 209/121
[51] Int. Cl. ......................................................... A01k 43/00
[58] Field of Search ........................... 209/121; 177/50, 253

[56] References Cited

UNITED STATES PATENTS 3,349,907  10/1967  Niederer et al. ....................... 209/121

FOREIGN PATENTS OR APPLICATIONS 740,246  11/1955  Great Britain ......................... 209/121

Primary Examiner—Allen N. Knowles
Attorney—Sperry and Zoda

[57] ABSTRACT

Equipment for grading eggs by weight wherein a balance beam is provided with an egg support on which an egg to be weighed is deposited by egg moving means. Means are located adjacent and above the egg support in position to be engaged by an egg deposited on the support and serve to stabilize and position the egg with respect to the balance beam so as to render the weighing operation more accurate and permit increased speed in operation of the equipment. The egg stabilizing means also cooperates with egg discharging means located below the egg support to aid in discharging an egg from the egg support when the balance beam is tilted.

17 Claims, 3 Drawing Figures

PATENTED JUN 27 1972 3,672,501
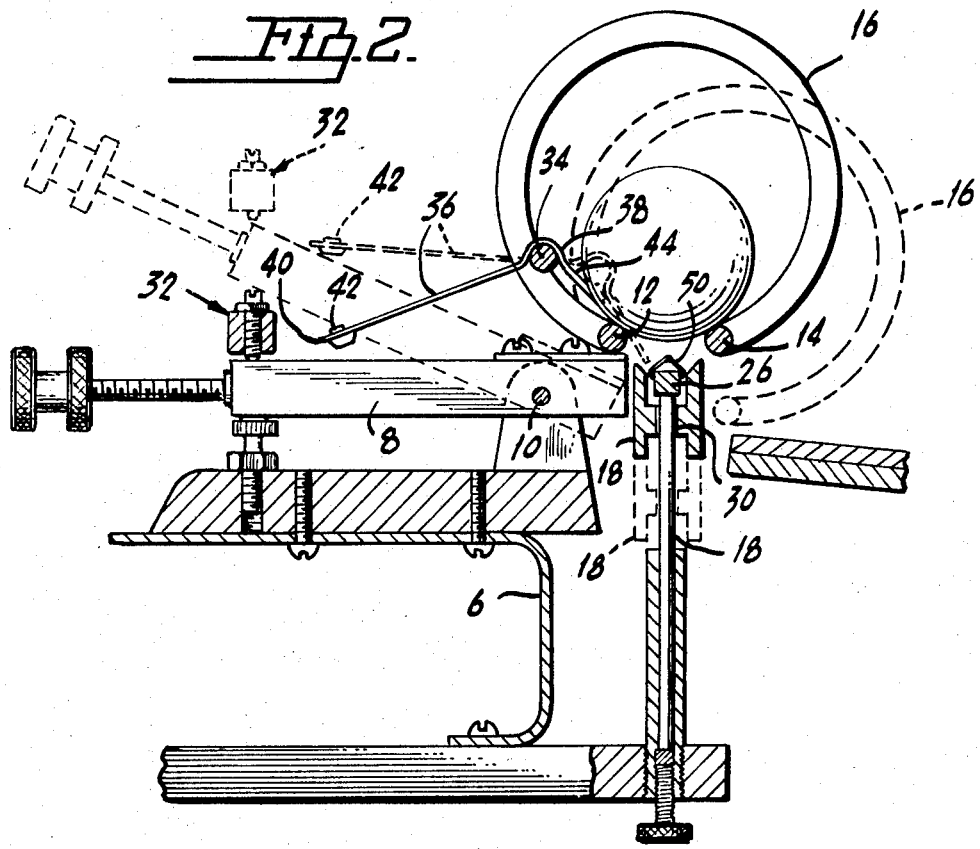
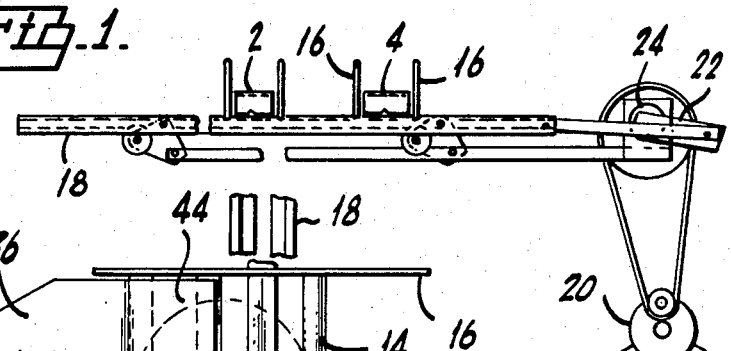
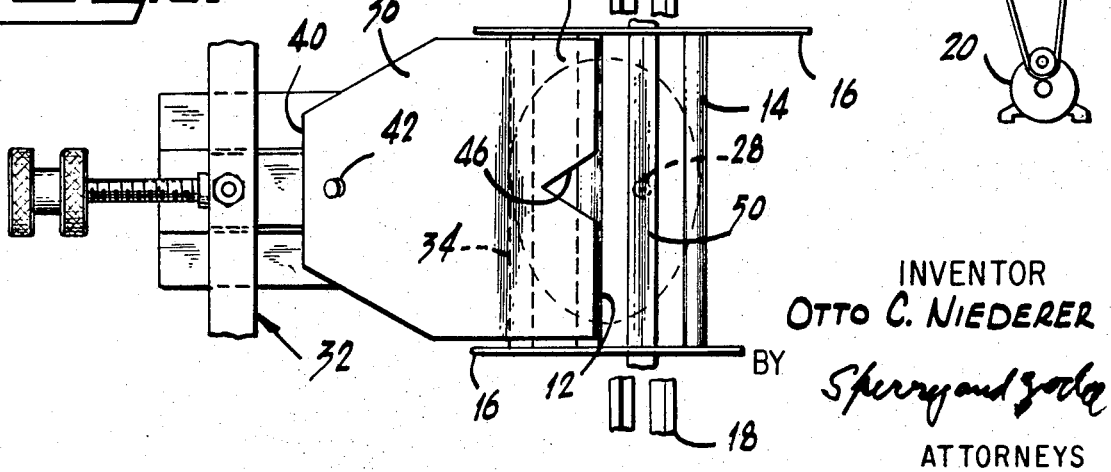
INVENTOR
Otto C. Niederer
BY Sperry and Zoda
ATTORNEYS

EGG STABILIZER

FIELD OF INVENTION

It is common practice in grading eggs by weight, to provide a series of graduated weighing devices having tiltable balance beams with spaced egg supporting rails mounted on the balance beams of each device. An egg moving means is then moved in an eliptical path or cyclic manner between the rails of the weighing devices to advance eggs from one weighing device to another and to deposit the eggs on the rails of the weighing device while allowing the balance beams to tilt and discharge an egg therefrom if the egg exceeds the weight for which the weighing device is adjusted. Typical equipment of this type is shown and described in U.S. Pat. No. 2,246,597. Further, in order to control the operation of the weighing devices and aid in discharging the eggs therefrom, such weighing devices are frequently provided with holding means for preventing the balance beams from tilting until an egg deposited on the rails has had an opportunity to come to rest and to aid in discharging an egg from the egg supporting rails upon limited tilting of the balance beam. Typical equipment of this type is shown and described in U.S. Pat. No. 2,646,168.

While equipment of the type referred to above has been widely used, the demand for higher speeds is operation and increased capacity of egg grading equipment have rendered it necessary to provide additional means and modified constructions for assuring proper and uniform placement of the eggs on the egg supporting rails of the weighing devices and for stabilizing the eggs so that they will not continue to rock or change in position during the weighing operation. An improvement of this type is disclosed in U.S. Pat. No. 3,349,907.

THE PRESENT INVENTION

In accordance with the present invention further improved means are provided for stabilizing and positioning the eggs on the egg supporting means of weighing devices and for aiding in the rapid discharge of eggs from the egg supporting means upon tilting of the balance beam. The construction thus provided not only serves to increase the capacity of the egg grading equipment, but also increases the accuracy of the weighing operation.

For this purpose the weighing device is provided with an egg stabilizing member which is pivotally supported on the weighing device and has a portion thereof located above the egg supporting rails in position to be engaged by an egg deposited on the rails. The portion engaged by an egg has oppositely inclined surfaces which aid in centering and stabilizing an egg with respect to the balance beam as it is lowered onto the egg supporting means by the egg moving means. At the same time said portion is yieldably urged transversely of the rails by a counter-weight or the like to aid in discharging an egg from its support upon tilting of the balance beam. The egg stabilizing and discharging means located above the egg supporting means also cooperates with egg discharging means located below and between the rails of the egg supporting means which is provided with an inclined surface facing outward from the weighing device to further aid in the rapid discharge of an egg from the weighing device upon limited tilting of the balance beam.

THE DRAWINGS

FIG. 1 is a side elevation of typical egg grading equipment embodying the present invention, FIG. 2 is a vertical sectional view of the construction shown in FIG. 1 taken on the line 2—2 thereof, and FIG. 3 is a perspective illustrating the egg stabilizing and discharging means located above the egg supporting means of the equipment shown in FIGS. 1 and 2.

PREFERRED EMBODIMENT OF THE INVENTION

In that form of the invention chosen for purposes of illustration in the drawings, the egg grading equipment embodies a plurality of weighing devices, two of which are shown at 2 and 4 in FIG. 1, although in practice it is usual to employ 24 or more weighing devices arranged longitudinally along a support 6. In such cases a group of, say six or more, weighing devices may be adjusted to respond to the weight of the heaviest or "jumbo" eggs, the next group of weighing devices respond to the weight of "large" eggs, and other groups respond to eggs of lesser weight until the final group respond to the weight of the smallest or "peewee" eggs.

Each of the egg weighing devices is provided with a balance beam 8 tiltable about pivot means 10 and provided with egg supporting means in the form of spaced parallel rails 12 and 14 which are connected to each other by longitudinally spaced loops 16. Egg moving means 18 in the form of an elongated conveyor bar is movable in an eliptical path or a cyclic manner in a vertical plane between the rails 12 and 14 of the egg supporting means of the weighing devices. Such movement of the conveyor bar may be effected by any suitable means such as a motor 20 which drives a crank 22 and eccentric 24 whereby the eggs are raised, advanced, and lowered in groups of five or more so as to be deposited on the egg supporting rails of the weighing devices of each successive group in the equipment. If an egg is of sufficient weight to tilt the balance beam of the device on which it is deposited the egg will be discharged at a selected location but if it is of lesser weight the weighing device will not be actuated and the egg will be picked up on the next cycle of movement of the egg conveying bar 18 so as to be advanced to the next group of weighing devices for weighing thereby.

As shown in FIG. 2 of the drawing egg discharging means 26 are positioned below the rails 12 and 14 of the weighing device and supported on rods 28 which extend vertically through slots 30 in the egg conveyor bar 18. The discharge means 26 is in the form of a longitudinally extending strip located above the conveyor bar 18 and positioned to engage the lower portion of an egg supported on the egg supporting rails of the weighing device upon tilting of the balance beam 8 to which said rails are connected. The balance beam is normally held in a predetermined, generally horizontal and idle position between successive weighing operations by means of a locking bar 32 or other suitable means. In this way the egg supporting means of the various weighing devices are held stationary as the eggs are deposited thereon so that the weighing operation will not be influenced by the operation of depositing the egg thereon and any tendency for the egg to rock or be displaced with reference to the weighing devices as it is moved from one device to another can be overcome before the weighing device is released for a weighing operation. Such release is effected by suitable means for raising the locking bar 32 from the balance beam in timed relation to the movement of the conveyor bar 18 as exemplified by the mechanism shown and described in said U.S. Pat. No. 2,646,168.

In accordance with the present invention the weighing devices are each provided with improved egg stabilizing and discharging means. For this purpose a rod 34 extends between the longitudinally spaced loops 16 and above the inner rail 12 of the egg supporting means of the weighing device. The egg stabilizing and discharging means is in the form of a plate 36 having a central portion 38 which extends over the rod 34 and rests thereon so that the plate is supported for pivotal movement about the rod 34. The rear portion 40 of the plate 36 is provided with a counter weight 42 which normally rests upon the upper surface of the balance beam 8 and serves to urge the front portion 44 of the plate to a position wherein it is elevated above the inner rail 12 of the egg supporting means and projects outward into a position wherein it will be engaged and deflected inward when an egg is deposited on the rails by the egg moving means. The front portion 44 of the plate 38 when thus deflected inward by an egg being deposited on the rails 12 and 14 serves to raise the counter weight 42 a short distance from the balance beam 8. The front portion 44 of the plate 38 will then be yieldably urged outward and transversely of the egg supporting rails by the action of the counter weight.

The front portion 44 of the plate 38 further is preferably provided with oppositely inclined edges or surfaces 46 which will be engaged by an egg being lowered into place on the rails 12 and 14 so as to aid in centering the egg with respect to the longitudinal axis of the balance beam 8. The surfaces 46 also serve to prevent the egg from rocking or being displaced longitudinally on the rails as it comes to rest thereon. In this way the egg is stabilized as it is lowered into place on the egg supporting means whereby it is possible to raise the locking bar 32 and release the balance beam of the weighing device instantly after the egg is deposited. The speed at which the eggs can be advanced and lowered into place on the egg supporting means and the weighing device readied for carrying out the weighing operation can then be materially increased.

When the locking bar 32 is raised from the balance beam 8 to permit the egg to be weighed, the front portion 44 of the plate 36 will be deflected and yieldably tend to urge the egg transversely of the rails 12 and 14. As a result only limited tilting of the balance beam and rails will be required to effect the discharge of an egg from the rails. Furthermore, the egg discharging means or strip 26 which is located below the rails 12 and 14 of the egg supporting means may be formed with an upper surface 50 which is inclined outwardly so that when it is engaged by the lower portion of an egg upon tilting of the balance beam and rails, the lower egg discharging means will also tend to displace the egg transversely with respect to the rails to discharge from the weighing device.

The combined action of the front portion 44 of the upper egg stabilizing and discharging means and the inclined surface 50 of the lower egg discharging means, causes the egg to be discharged from the weighing device promptly upon minimum tilting of the balance beam. Therefore eggs of border-line weight which are sometimes called "lazy eggs" and only tend to tilt the balance beam slowly, will nevertheless be discharged quickly from the weighing device permitting the speed of operation of the equipment to be further increased. At the same time the accuracy of the weighing operation can be improved and the egg grading capacity of the equipment can be increased.

In employing the present invention it is possible to apply the egg stabilizing and discharging plate 38 to existing egg grading equipment such as shown in U.S. Pat. No. 2,646,268. In a similar way, it is possible to apply a cap strip presenting the inclined surface 50 of the lower egg discharging means of the present invention to the longitudinally extending egg discharging strip or bar of such prior equipment. In this way the advantages of the present invention may be attained by applying simple nd inexpensive elements to constructions of the prior art or to install such improvements to new and original equipment as desired.

I claim:

1. Equipment for grading eggs by weight comprising a balance beam with egg supporting means thereon, means for depositing an egg on said egg supporting means, egg stabilizing means movably mounted adjacent said egg supporting means and having a portion thereof positioned to be engaged by an egg deposited on the supporting means to control movement of the egg with respect to the supporting means.

2. Equipment as defined in claim 1 wherein said egg stabilizing means is pivotally mounted for yielding movement by an egg being deposited on said supporting means.

3. Equipment as defined in claim 1 wherein said egg stabilizing means has a counter-weight connected thereto for yieldably urging said portion thereof into position to be engaged by an egg being deposited on the supporting means.

4. Equipment as defined in claim 1 wherein said egg stabilizing means is movable with said balance beam.

5. Equipment as defined in claim 1 wherein said portion of the egg stabilizing means which engages an egg has inclined surfaces for guiding an egg being deposited on said supporting means.

6. Equipment for grading eggs by weight comprising a balance beam with spaced rails thereon and an egg moving means movable between said rails to advance an egg into a position above said rails and thereafter lower said egg onto said rails, an egg stabilizing device pivotally mounted adjacent said rails and having a portion thereof projecting into a position above said rails wherein it will engage said egg being lowered onto the rails by said egg moving means and control movement of the egg with respect to said rails 7. Equipment as defined in claim 6 wherein said portion of said egg stabilizing means presents two longitudinally spaced egg engaging surfaces for contacting the egg to prevent the egg from rocking with respect to said rails.

8. Equipment as defined in claim 6 wherein said portion of said egg stabilizing means presents oppositely inclined surfaces engageable by an egg being lowered onto said rails by said egg moving means to aid in centering the egg with respect to the balance beam.

9. Equipment as defined in claim 6, wherein said egg stabilizing means is movable with said balance beam.

10. Equipment as defined in claim 9 wherein said egg stabilizing means has a counter-weight thereon yieldably urging said portion of the stabilizing means into an egg engaging position above said rails.

11. Equipment as defined in claim 6 wherein means are located below said rails in position to be engaged by the lower portion of an egg located on said rails on tilting of the balance beam from a predetermined idle position and cooperating with the egg stabilizing means to effect the discharge of an egg from said rails on such tilting of the balance beam.

12. Equipment for grading eggs by weight comprising a balance beam having spaced egg supporting rails thereon, egg moving means movable longitudinally and vertically between said rails for depositing an egg on said rails, and egg discharging means including members normally located above and below said egg supporting rails and engageable with an egg on said rails to effect the discharge of an egg therefrom upon tilting of the balance beam from a predetermined idle position, that member of the egg discharging means which is located above said rails being yieldably movable transversely of said rails to aid in the discharge of an egg therefrom.

13. Egg grading means as defined in claim 12 wherein that member of said egg discharging means which is located above said egg supporting rails is mounted for pivotal movement with respect to said balance beam and egg supporting rails.

14. Egg grading means as defined in claim 12 wherein that member of the egg discharging means which is located above said egg supporting rails is provided with a portion positioned to engage an egg when it is deposited on said rails by said egg moving means, and that member of the egg discharging means which is normally located below said rails is positioned to engage an egg located on the rails only upon tilting of said balance beam from a predetermined idle position.

15. Egg grading equipment as defined in claim 14 wherein that member of said egg discharging means which is located above the egg supporting rails is provided with a portion positioned on that side of the egg supporting rails adjacent the balance beam and has a counter-weight thereon tending to move said portion transversely of the egg supporting rails to aid in discharging an egg from said rails when the balance beam is tilted from a predetermined idle position.

16. Egg grading equipment as defined in claim 12 wherein means are provided for holding said balance beam in said predetermined idle position between weighing operations and while an egg is being deposited on said rails.

17. An egg discharging device for use with a weighing device of egg grading equipment which includes a tiltable balance beam provided with spaced egg supporting rails, said egg discharging device being held in a fixed position during a weighing operation and being located between and below the said rails when the balance beam is in its normal untilted position, said discharge device presenting a transversely inclined upper surface which projects above at least one of the egg supporting rails when said balance beam is tilted.

* * * * *